(12) United States Patent
Hansson

(10) Patent No.: US 12,202,396 B1
(45) Date of Patent: Jan. 21, 2025

(54) LINE-SCAN-GATED IMAGING FOR LIDAR HEADLIGHT

(71) Applicant: Magna Electronics, LLC, Southfield, MI (US)

(72) Inventor: Peter Hansson, Stockholm (SE)

(73) Assignee: Magna Electronics, LLC, Southfield, MI (US)

( * ) Notice: Subject to any disclaimer, the term of this patent is extended or adjusted under 35 U.S.C. 154(b) by 0 days.

(21) Appl. No.: 18/545,311

(22) Filed: Dec. 19, 2023

(51) Int. Cl.
| | | |
|---|---|---|
| *B60Q 1/00* | (2006.01) | |
| *F21S 41/13* | (2018.01) | |
| *F21S 41/37* | (2018.01) | |
| *F21Y 115/10* | (2016.01) | |
| *G01S 7/481* | (2006.01) | |
| *G01S 17/89* | (2020.01) | |

(52) U.S. Cl.
CPC ............ *B60Q 1/0023* (2013.01); *F21S 41/13* (2018.01); *F21S 41/37* (2018.01); *G01S 17/89* (2013.01); *F21Y 2115/10* (2016.08); *G01S 7/4813* (2013.01)

(58) Field of Classification Search
CPC ............. B60Q 1/0023; F21S 41/30–37; G01S 7/481–4813; G01S 17/88–931
See application file for complete search history.

(56) References Cited

U.S. PATENT DOCUMENTS

| | | |
|---|---|---|
| 1,520,245 A | 12/1924 | Jules |
| 3,712,985 A | 1/1973 | Swarner et al. |
| 3,898,656 A | 8/1975 | Jensen |
| 4,125,864 A | 11/1978 | Aughton |
| 4,184,154 A | 1/1980 | Albanese et al. |

(Continued)

FOREIGN PATENT DOCUMENTS

| | | |
|---|---|---|
| AT | 509180 | 6/2011 |
| AU | 6638286 A | 6/1987 |

(Continued)

OTHER PUBLICATIONS

"A milestone for laswer sensors in self-driving cars," OSRAM Opto Semiconductors, Trade Press, Jul. 2016, 3 pages.

(Continued)

*Primary Examiner* — Jason M Han
(74) *Attorney, Agent, or Firm* — Matthew D. Thayne; Thayne and Davis LLC

(57) ABSTRACT

An object detection system and method for a vehicle headlight include a visible light emitter and an object sensing subsystem having an infrared line emitter for emitting infrared detection radiation and an infrared line detector. An optical subsystem receives the visible light and directs it into an external region to illuminate the external region and receives the infrared detection radiation and directs it onto an object in the external region. The optical subsystem includes a partially reflective element optically between the infrared line emitter and the external region and optically between the object sensing subsystem and the external region. The partially reflective element is configured to pass one of the infrared detection radiation and the visible light and to reflect the other of the infrared detection radiation and the visible light, such that the object sensing subsystem senses the object in a line-scan-gated mode.

25 Claims, 9 Drawing Sheets

(56) References Cited

U.S. PATENT DOCUMENTS

| | | |
|---|---|---|
| 4,362,361 A | 12/1982 | Campbell et al. |
| 4,439,766 A | 3/1984 | Kobayashi et al. |
| 4,765,715 A | 8/1988 | Matsudaira et al. |
| 4,957,362 A | 9/1990 | Peterson |
| 5,200,606 A | 4/1993 | Krasutsky et al. |
| 5,210,586 A | 5/1993 | Grage et al. |
| 5,274,379 A | 12/1993 | Carbonneau et al. |
| 5,428,215 A | 6/1995 | Dubois et al. |
| 5,604,695 A | 2/1997 | Cantin et al. |
| 5,793,491 A | 8/1998 | Wangler et al. |
| 5,889,490 A | 3/1999 | Wachter et al. |
| 5,966,226 A | 10/1999 | Gerber |
| 6,078,395 A | 6/2000 | Jourdain et al. |
| 6,122,222 A | 9/2000 | Hossack et al. |
| 6,292,285 B1 | 9/2001 | Wang et al. |
| 6,384,770 B1 | 5/2002 | De Gouy et al. |
| 6,437,854 B2 | 8/2002 | Hahlweg |
| 6,556,282 B2 | 4/2003 | Jamieson et al. |
| 6,559,932 B1 | 5/2003 | Halmos |
| 7,202,941 B2 | 4/2007 | Munro |
| 7,227,116 B2 | 6/2007 | Gleckler |
| 7,272,271 B2 | 9/2007 | Kaplan et al. |
| 7,440,084 B2 | 10/2008 | Kane |
| 7,483,600 B2 | 1/2009 | Achiam et al. |
| 7,489,865 B2 | 2/2009 | Varshneya et al. |
| 7,544,945 B2 | 6/2009 | Tan et al. |
| 7,570,347 B2 | 8/2009 | Ruff et al. |
| 7,675,610 B2 | 3/2010 | Redman et al. |
| 7,832,762 B2 | 11/2010 | Breed |
| 8,044,999 B2 | 10/2011 | Mullen et al. |
| 8,050,863 B2 | 11/2011 | Trepagnier et al. |
| 8,134,637 B2 | 3/2012 | Rossbach et al. |
| 8,223,215 B2 | 7/2012 | Oggier et al. |
| 8,363,511 B2 | 1/2013 | Frank et al. |
| 8,508,723 B2 | 8/2013 | Chang et al. |
| 8,629,975 B1 | 1/2014 | Dierking et al. |
| 8,742,325 B1 | 6/2014 | Droz et al. |
| 8,836,761 B2 | 9/2014 | Wang et al. |
| 8,836,922 B1 | 9/2014 | Pennecot et al. |
| 8,879,050 B2 | 11/2014 | Ko |
| 9,007,569 B2 | 4/2015 | Amzajerdian et al. |
| 9,063,549 B1 | 6/2015 | Pennecot et al. |
| 9,086,273 B1 | 7/2015 | Gruver et al. |
| 9,090,213 B2 | 7/2015 | Lawlor et al. |
| 9,097,646 B1 | 8/2015 | Campbell et al. |
| 9,140,792 B2 | 9/2015 | Zeng et al. |
| 9,157,790 B2 | 10/2015 | Shpunt et al. |
| 9,267,787 B2 | 2/2016 | Shpunt et al. |
| 9,285,477 B1 | 3/2016 | Smith et al. |
| 9,482,412 B2 | 11/2016 | Schwaiger et al. |
| 9,575,162 B2 | 2/2017 | Owechko |
| 9,618,742 B1 | 4/2017 | Droz et al. |
| 9,651,417 B2 | 5/2017 | Shpunt et al. |
| 9,658,322 B2 | 5/2017 | Lewis |
| 9,696,427 B2 | 7/2017 | Wilson et al. |
| 9,711,493 B2 | 7/2017 | Lin |
| 9,753,351 B2 | 9/2017 | Eldada |
| 9,823,351 B2 | 11/2017 | Haslim et al. |
| 9,857,472 B2 | 1/2018 | Mheen et al. |
| 9,869,754 B1 | 1/2018 | Campbell et al. |
| 10,018,725 B2 | 7/2018 | Liu |
| 10,018,726 B2 | 7/2018 | Hall et al. |
| 10,024,655 B2 | 7/2018 | Raguin et al. |
| 10,078,133 B2 | 9/2018 | Dussan |
| 10,088,557 B2 | 10/2018 | Yeun |
| 10,148,060 B2 | 12/2018 | Hong et al. |
| 10,175,360 B2 | 1/2019 | Zweigle et al. |
| 10,183,541 B2 | 1/2019 | Van Den Bossche et al. |
| 10,369,922 B2 | 8/2019 | Nakashima et al. |
| 10,408,924 B2 | 9/2019 | Mheen et al. |
| 10,411,524 B2 | 9/2019 | Widmer et al. |
| 10,416,292 B2 | 9/2019 | De Mersseman et al. |
| 10,473,767 B2 | 11/2019 | Xiang et al. |
| 10,473,784 B2 | 11/2019 | Puglia |
| 10,473,943 B1 | 11/2019 | Hughes |
| 10,551,501 B1 | 2/2020 | Lachapelle |
| 10,557,923 B2 | 2/2020 | Watnik et al. |
| 10,558,044 B2 | 2/2020 | Pan |
| 10,564,268 B2 | 2/2020 | Turbide et al. |
| 10,578,724 B2 | 3/2020 | Droz et al. |
| 10,627,493 B2 | 4/2020 | Morikawa et al. |
| 10,678,117 B2 | 6/2020 | Shin et al. |
| 10,768,346 B2 | 9/2020 | Miner et al. |
| 10,775,508 B1 | 9/2020 | Rezk et al. |
| 10,937,773 B2 | 3/2021 | T'Ng et al. |
| 11,326,758 B1 | 5/2022 | De Mersseman et al. |
| 2001/0052872 A1 | 12/2001 | Hahlweg |
| 2003/0043363 A1 | 3/2003 | Jamieson et al. |
| 2004/0028418 A1 | 2/2004 | Kaplan et al. |
| 2004/0031906 A1 | 2/2004 | Gleckler |
| 2004/0135992 A1 | 7/2004 | Munro |
| 2004/0155249 A1 | 8/2004 | Narui et al. |
| 2005/0219506 A1 | 10/2005 | Okuda et al. |
| 2006/0072189 A1 | 4/2006 | DiMarzio et al. |
| 2006/0221250 A1 | 10/2006 | Rossbach et al. |
| 2006/0232052 A1 | 10/2006 | Breed |
| 2006/0239312 A1 | 10/2006 | Kewitsch et al. |
| 2007/0140613 A1 | 6/2007 | Achiam et al. |
| 2007/0181810 A1 | 8/2007 | Tan et al. |
| 2007/0211786 A1 | 9/2007 | Shattil |
| 2007/0219720 A1 | 9/2007 | Trepagnier et al. |
| 2008/0088499 A1 | 4/2008 | Bonthron et al. |
| 2008/0095121 A1 | 4/2008 | Shattil |
| 2008/0100510 A1 | 5/2008 | Bonthron et al. |
| 2008/0219584 A1 | 9/2008 | Mullen et al. |
| 2008/0246944 A1 | 10/2008 | Redman et al. |
| 2009/0002680 A1 | 1/2009 | Ruff et al. |
| 2009/0010644 A1 | 1/2009 | Varshneya et al. |
| 2009/0190007 A1 | 7/2009 | Oggier et al. |
| 2009/0251361 A1 | 10/2009 | Beasley |
| 2010/0027602 A1 | 2/2010 | Abshire et al. |
| 2010/0157280 A1 | 6/2010 | Kusevic et al. |
| 2010/0182874 A1 | 7/2010 | Frank et al. |
| 2012/0075422 A1 | 3/2012 | Wang et al. |
| 2012/0182540 A1 | 7/2012 | Suzuki et al. |
| 2012/0206712 A1 | 8/2012 | Chang et al. |
| 2012/0236379 A1 | 9/2012 | Da Silva et al. |
| 2012/0310516 A1 | 12/2012 | Zeng |
| 2012/0310519 A1 | 12/2012 | Lawlor et al. |
| 2013/0088726 A1 | 4/2013 | Goyal et al. |
| 2013/0093584 A1 | 4/2013 | Schumacher |
| 2013/0120760 A1 | 5/2013 | Raguin et al. |
| 2013/0166113 A1 | 6/2013 | Dakin et al. |
| 2013/0206967 A1 | 8/2013 | Shpunt et al. |
| 2013/0207970 A1 | 8/2013 | Shpunt et al. |
| 2013/0222786 A1 | 8/2013 | Hanson et al. |
| 2013/0250276 A1 | 9/2013 | Chang et al. |
| 2013/0265561 A1 | 10/2013 | Takahira et al. |
| 2014/0009747 A1 | 1/2014 | Suzuki et al. |
| 2014/0036252 A1 | 2/2014 | Amzajerdian et al. |
| 2014/0049609 A1 | 2/2014 | Wilson et al. |
| 2014/0152975 A1 | 6/2014 | Ko |
| 2014/0168631 A1 | 6/2014 | Haslim et al. |
| 2014/0233942 A1 | 8/2014 | Kanter |
| 2014/0313519 A1 | 10/2014 | Shpunt et al. |
| 2015/0009485 A1 | 1/2015 | Mheen et al. |
| 2015/0055117 A1 | 2/2015 | Pennecot et al. |
| 2015/0234308 A1 | 8/2015 | Lim et al. |
| 2015/0260843 A1 | 9/2015 | Lewis |
| 2015/0301162 A1 | 10/2015 | Kim |
| 2015/0371074 A1 | 12/2015 | Lin |
| 2015/0378011 A1 | 12/2015 | Owechko |
| 2016/0047895 A1 | 2/2016 | Dussan |
| 2016/0047896 A1 | 2/2016 | Dussan |
| 2016/0047903 A1 | 2/2016 | Dussan |
| 2016/0138944 A1 | 5/2016 | Lee et al. |
| 2016/0178749 A1 | 6/2016 | Lin et al. |
| 2016/0200161 A1 | 7/2016 | Van Den Bossche et al. |
| 2016/0245902 A1 | 8/2016 | Watnik et al. |
| 2016/0280229 A1 | 9/2016 | Kasahara |
| 2016/0291160 A1 | 10/2016 | Zweigle et al. |
| 2016/0357187 A1 | 12/2016 | Ansari |
| 2016/0363669 A1 | 12/2016 | Liu |
| 2016/0380488 A1 | 12/2016 | Widmer et al. |

(56) References Cited

U.S. PATENT DOCUMENTS

| | | |
|---|---|---|
| 2017/0023678 A1 | 1/2017 | Pink et al. |
| 2017/0090013 A1 | 3/2017 | Paradie et al. |
| 2017/0102457 A1 | 4/2017 | Li et al. |
| 2017/0199273 A1 | 7/2017 | Morikawa et al. |
| 2017/0219696 A1 | 8/2017 | Hayakawa et al. |
| 2017/0269215 A1 | 9/2017 | Hall et al. |
| 2017/0270381 A1 | 9/2017 | Itoh et al. |
| 2017/0285346 A1 | 10/2017 | Pan |
| 2017/0307736 A1 | 10/2017 | Donovan |
| 2017/0307737 A1 | 10/2017 | Ishikawa et al. |
| 2017/0310948 A1 | 10/2017 | Pei et al. |
| 2017/0329010 A1 | 11/2017 | Warke et al. |
| 2017/0329011 A1 | 11/2017 | Warke et al. |
| 2018/0052378 A1 | 2/2018 | Shin et al. |
| 2018/0113193 A1 | 4/2018 | Huemer et al. |
| 2018/0128903 A1 | 5/2018 | Chang |
| 2018/0136328 A1 | 5/2018 | Moss |
| 2018/0143309 A1 | 5/2018 | Pennecot et al. |
| 2018/0180718 A1 | 6/2018 | Lin |
| 2018/0224529 A1 | 8/2018 | Wolf et al. |
| 2018/0241477 A1 | 8/2018 | Turbide et al. |
| 2018/0275249 A1 | 9/2018 | Campbell et al. |
| 2018/0275275 A1 | 9/2018 | Lundquist |
| 2018/0284237 A1 | 10/2018 | Campbell et al. |
| 2018/0284282 A1 | 10/2018 | Hong et al. |
| 2018/0284286 A1 | 10/2018 | Eichenholz et al. |
| 2018/0286909 A1 | 10/2018 | Eichenholz et al. |
| 2018/0306913 A1 | 10/2018 | Bartels |
| 2018/0341009 A1 | 11/2018 | Niclass et al. |
| 2018/0364334 A1 | 12/2018 | Xiang et al. |
| 2018/0372870 A1 | 12/2018 | Puglia |
| 2019/0018143 A1 | 1/2019 | Thayer et al. |
| 2019/0101644 A1 | 4/2019 | De Mersseman et al. |
| 2019/0113200 A1 | 4/2019 | Murakami |
| 2019/0123508 A1 | 4/2019 | Hong et al. |
| 2019/0129009 A1 | 5/2019 | Eichenholz et al. |
| 2019/0139951 A1 | 5/2019 | T'Ng et al. |
| 2019/0146060 A1 | 5/2019 | Qiu et al. |
| 2019/0195990 A1 | 6/2019 | Shand |
| 2019/0221988 A1 | 7/2019 | Villeneuve et al. |
| 2019/0235064 A1 | 8/2019 | Droz et al. |
| 2019/0242978 A1 | 8/2019 | Weed et al. |
| 2019/0265336 A1 | 8/2019 | Zhang et al. |
| 2019/0310351 A1 | 10/2019 | Hughes et al. |
| 2020/0081129 A1 | 3/2020 | De Mersseman et al. |
| 2020/0088847 A1 | 3/2020 | De Mersseman et al. |
| 2020/0249354 A1 | 8/2020 | Yeruhami et al. |
| 2020/0284906 A1 | 9/2020 | Eichenholz et al. |
| 2020/0341120 A1 | 10/2020 | Ahn et al. |
| 2020/0341121 A1 | 10/2020 | Ahn et al. |
| 2021/0018602 A1 | 1/2021 | De Mersseman et al. |
| 2021/0190919 A1 | 6/2021 | De Mersseman |
| 2022/0146817 A1 | 5/2022 | Erdl et al. |
| 2022/0333757 A1 | 10/2022 | Li et al. |
| 2022/0403998 A1 | 12/2022 | De Mersseman et al. |

FOREIGN PATENT DOCUMENTS

| | | | |
|---|---|---|---|
| CN | 102508258 | 6/2012 | |
| DE | 19731754 | 2/1999 | |
| DE | 19757840 | 9/1999 | |
| DE | 102004033944 | 2/2006 | |
| DE | 102006031114 | 1/2008 | |
| DE | 102008045387 | 3/2010 | |
| DE | 102014218957 | 3/2016 | |
| DE | 102015217908 | 3/2017 | |
| DE | 102015224692 | 6/2017 | |
| DE | 102016201606 | 8/2017 | |
| EP | 0112188 | 6/1984 | |
| EP | 0578129 | 1/1994 | |
| EP | 2124069 | 11/2009 | |
| EP | 2696166 | 2/2014 | |
| EP | 2824418 | 1/2015 | |
| EP | 3147685 | 3/2017 | |
| EP | 3203259 | 8/2017 | |
| EP | 3457080 | 3/2019 | |
| IT | 201800001765 | 7/2019 | |
| JP | 2002148556 | 5/2002 | |
| JP | 2018041723 | 3/2018 | |
| JP | 2020009683 A | * 1/2020 | ............. F21S 41/20 |
| KR | 20190105889 | 9/2019 | |
| WO | 1994019705 | 9/1994 | |
| WO | 03009048 | 1/2003 | |
| WO | 2008/008970 | 1/2008 | |
| WO | 2015/014556 | 2/2015 | |
| WO | 2016072483 | 5/2016 | |
| WO | 2016/097409 | 6/2016 | |
| WO | 2016204138 | 12/2016 | |
| WO | 2018229131 | 12/2018 | |
| WO | 2019050643 | 3/2019 | |
| WO | 2019099166 | 5/2019 | |
| WO | 2020243038 | 12/2020 | |

OTHER PUBLICATIONS

"Advanced Scientific Concepts," http://www.advancedscientific-concepts.com/products/overview.html, 2015, 4 pages.

"Cameras," Continental Automotive, https://www.continental-automotive.com/en-gl/Passenger-Cars/Chassis-Safety/Advanced-Driver-Assistance-Systems/Cameras, 2017, 2 pages.

"Hi-Res 3D Flash LIDAR will supplement Continental's existing portfolio for automated driving," Continental AG, Mar. 2016, 2 pages.

"Multi Function Camera with Lidar," Continental Automotive, https://www.continental-automotive.com/en-gl/Passenger-Cars/Chassis-Safety/Advanced-Driver-Assistance-Systems/Cameras/Multi-Function-Camera-with-Lidar, 2017, 2 pages.

Campbell et al., "Advanced sine wave modulation of continuous wave laser system for atmospheric $CO_2$ differential absorption measurements," NASA Langley Research Center; 32 pages.

Church et al., "Evaluation of a steerable 3D laser scanner using a double Risley prism pair," SPIE Paper, 9 pages.

Hewlett-Packard Application Note 77-4, "Swept-Frequency Group Delay Measurements," Hewlett-Packard Co., Sep. 1968, 7 pages.

Journet & Bazin, "A Low-Cost Laser Range Finder Based on an FMCW-Like Method," IEEE Transactions on Instrumentation and Measurement, vol. 49, No. 4, Aug. 2000, 4 pages.

Kahn, "Modulation and Detection Techniques for Optical Communication Systems," OSA/COTA, 2006, 3 pages.

Kasturi et al., "UAV-Borne LiDAR with MEMS Mirror Based Scanning Capability," SPIE Defense and Commercial Sensing Conference, Apr. 2016, 10 pages.

Kravitz et al., "High-Resolution Low-Sidelobe Laser Ranging Based on Incoherent Pulse Compression," IEEE Photonics Technology Letters, vol. 24, No. 23, Dec. 2012, 3 pages.

Levanon et al., "Non-coherent pulse compression—aperiodic and periodic waveforms," IET Radar Sonar Navig., Jun. 2015, 9 pages.

Li et al., "Investigation of beam steering performances in rotation Risley-prism scanner," OSA, Jun. 2016, 11 pages.

Li, "Time-of-Flight Camera—An Introduction," Technical White Paper, SLOA190B, May 2014, 10 pages.

Luhmann, "A historical review on panorama photogrammetry," University of Applied Sciences, Jul. 2008, 9 pages.

Niclass et al., "Development of Automotive LIDAR," Electronics and Communications in Japan, vol. 98, No. 5, 2015, pp. 1-6.

Peer & Levanon, "Compression Waveforms for Non-Coherent Radar," Compression Waveforms for Non-Coherent Radar, Tel Aviv University; 6 pages.

Pierrottet et al., "Linear FMCW Laser Radar for Precision Range and Vector Velocity Measurements," Coherent Applications Inc. & NASA Langley Research Center, 9 pages.

Simpson et al., "Intensity-modulated, stepped frequency cw lidar for distributed aerosol an dhard target measurements," Applied Optics, vol. 44, No. 33, Nov. 2005, 8 pages.

Skolnik, "Introduction to Radar Systems," McGraw-Hill Higher Education, 2001, 6 pages.

Su et al., "2-D FFT and Time-Frequency Analysis Techniques for Multi-Target Recognition of FMCW Radar Signal," Proceedings of the Asia-Pacific Microwave Conference, 2011, 4 pages.

(56) References Cited

OTHER PUBLICATIONS

Thorlabs Application Note, Risley Prism Scanner; 33 pages.
Wang et al., "Range-Doppler image processing in linear FMCW radar and FPGA based real-time implementation," Journal of Communication and Computer, vol. 6, No. 4, Apr. 2009, 5 pages.
Wien, "The Geometry of Airborne Laser Scanning in a Kinematical Framework," Vienna University of Technology, Oct. 2016, 69 pages.
Winkler, "Range Doppler Detection for automotive FMCW Radars," Proceedings of the 4th European Radar Conference, Oct. 2007, 4 pages.
Wojtkiewicz et al., "Two-dimensional signal processing in FMCW radars," Instytut Podstaw Elektroniki, 6 pages.
Invitation to Pay Additional Fees and, Where Applicable, Protest Fee issued in International Application No. PCT/US2018/052849 on Mar. 8, 2019.
International Search Report and Written Opinion issued in International Application No. PCT/US2018/052849 on May 6, 2019.
International Search Report and Written Opinion issued in International Application No. PCT/US2018/057676 on Jan. 23, 2019.
International Search Report and Written Opinion issued in International Application No. PCT/US2019/046800 on Nov. 25, 2019.
International Search Report and Written Opinion issued in International Application No. PCT/US2020/039760 on Sep. 18, 2020.
International Search Report and Written Opinion issued in International Application No. PCT/US2020/064474 on Apr. 1, 2021.
International Search Report and Written Opinion issued in International Application No. PCT/US2017/033263 on Aug. 29, 2017.
International Search Report and Written Opinion issued in International Application No. PCT/US2017/033265 on Sep. 1, 2017.
International Search Report and Written Opinion issued in International Application No. PCT/US2017/033271 on Sep. 1, 2017.
International Search Report and Written Opinion issued in International Application No. PCT/US2018/048869 on Nov. 8, 2018.
International Search Report and Written Opinion issued in International Application No. PCT/US2018/049038 on Dec. 12, 2018.
International Search Report and Written Opinion issued in International Application No. PCT/US2018/051281 on Nov. 22, 2018.
International Search Report and Written Opinion issued in International Application No. PCT/US2018/052837 on Jan. 24, 2019.
International Search Report and Written Opinion issued in International Application No. PCT/US2018/054992 on Dec. 11, 2018.
International Search Report and Written Opinion issued in International Application No. PCT/US2018/057727 on Jan. 28, 2019.
International Search Report and Written Opinion issued in International Application No. PCT/US2023/034129 on Jan. 3, 2024.
International Search Report and Written Opinion issued in International Application No. PCT/US2023/034131 on Dec. 21, 2023.

\* cited by examiner

LINE-SCAN-GATED IMAGING FOR LIDAR HEADLIGHT

BACKGROUND

1. Technical Field

The present disclosure is related to headlights and, in particular, to line-scan-gated imaging in light detection and ranging (LiDAR) headlights.

2. Discussion of Related Art

A vehicle such as an automobile typically includes an illumination system. A headlight, for example, is typically located on the front of the vehicle and at least partially illuminates a path in front the vehicle. The vehicle may also include a sensor on the vehicle to sense objects in the vehicle's path or otherwise in front of the vehicle.

SUMMARY

According to a first aspect, the present disclosure is directed to a system comprising a light emitter for emitting visible light and an object sensing subsystem comprising an infrared line emitter for emitting infrared detection radiation and an infrared line detector. An optical subsystem receives the visible light and directs the visible light into an external region to illuminate the external region and receives the infrared detection radiation from the infrared line emitter and directs the infrared detection radiation onto an object in the external region. The optical subsystem comprises a partially reflective element optically between the infrared line emitter and the external region and optically between the object sensing subsystem and the external region, the partially reflective element being configured to pass one of the infrared detection radiation and the visible light and to reflect the other of the infrared detection radiation and the visible light, such that the object sensing subsystem senses the object in a line-scan-gated mode.

According to another aspect, the present disclosure is directed to an object detection method for a vehicle headlight. The method includes: (i) emitting visible light from a light emitter; (ii) providing an object sensing subsystem with an infrared line emitter for emitting infrared detection radiation and a linear infrared line detector; and (iii) with an optical subsystem, receiving the visible light and directing the visible light into an external region to illuminate the external region, receiving the infrared detection radiation from the infrared line emitter and directing the infrared detection radiation onto an object in the external region. The optical subsystem comprises a partially reflective element optically between the light emitter and the external region and optically between the object sensing subsystem and the external region, the partially reflective element being configured to pass one of the infrared detection radiation and the visible light and to reflect the other of the infrared detection radiation and the visible light, such that the object sensing subsystem senses the object in a line-scan-gated mode.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Figure 1:
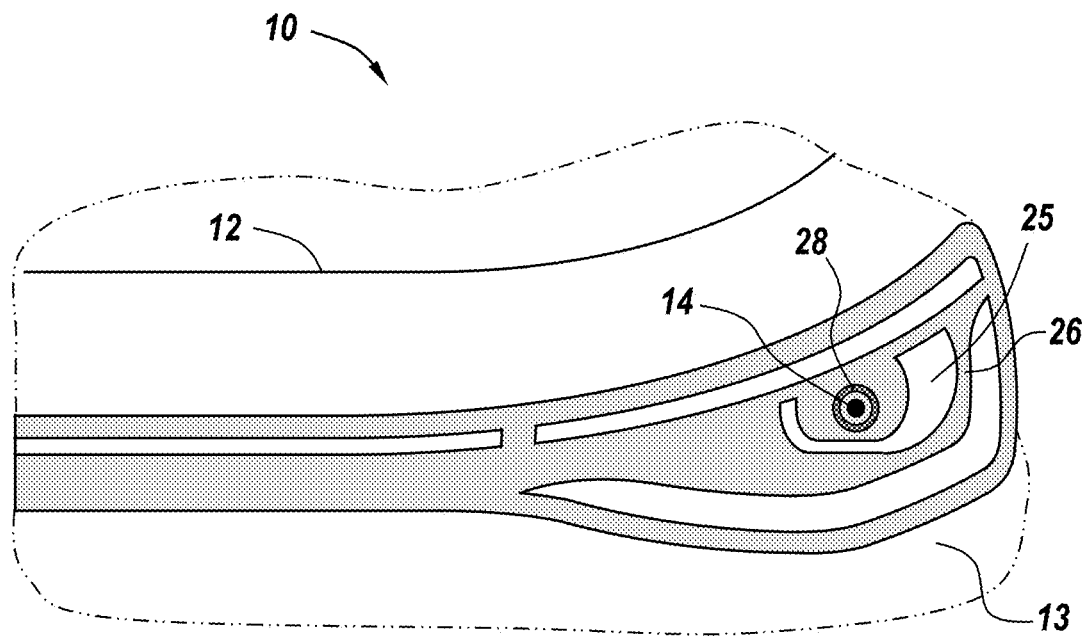
FIG. 1 is a diagram illustrating part of a front end of an automobile or vehicle, which includes an exemplary system, which integrates an optical sensing subsystem, such as, for example, LiDAR transmission and receiving elements and/or optics, and an optical subsystem into a headlight system, according to some exemplary embodiments.

A sensor system in an automobile can be used to detect and classify object in the road such as potholes, vulnerable road users (VRUs)), road debris such as lost cargo, etc. Detection and classification at long distances is desirable and requires a sensor system with both long range and high angular resolution. At the same time, a large field of view (FOV) and a high frame rate are also desirable.

Radio detection and ranging (radar), including imaging radar, cannot reach the required resolution with a reasonable aperture size, e.g., 2 m would be required for 0.1° resolution. Cameras can achieve the required angular resolution, but the image contrast can often be too low for reliable detection, for example, at night or when the color of the object is similar to that of the background. In these cases, even if the objects can be seen, distance information is often inferred rather than measured and, therefore, can be unreliable.

A traditional LiDAR system could potentially achieve the required resolution but can lead to a very high point rate requirement. For example, to achieve a FOV of 90°×30° with 0.05°×0.05° resolution over the entire FOV, 90/0.05× 30/0.05=1.1 Mpoints/frame would be required. With a 10 Hz frame rate, 11 Mpoints/sec point rate would be required. Conventional LiDAR systems have point rates up to a few Mpoints/sec. Scaling these point rates to ten times higher is not practical at reasonable cost, size and power consumption.

According to the present disclosure, with gated imaging, adequate angular resolution can be achieved, since a "standard" image sensor is used. That is, for example, a 1.3 Mpixel sensor operated at 10 Hz frame rate results in 13 Mpoints/sec point rate. Distance information is obtained by transmitting a light pulse and then delaying the camera exposure. Range bins are achieved with multiple exposures with different delay.

Conventional gated imaging is usually done with an area sensor, but this approach has two disadvantages. First, a very high pulse energy/peak power is required, which means that relatively costly and high-power-consumption lasers have to be used. Second, long range requires a large collecting aperture, which means that the focal length of the receive (Rx) lens has to be relatively long. Long focal length and large FOV result in large sensor size, which drives high cost.

According to the present disclosure, the solution described herein uses line-scan gated imaging. According to the current technology, an image of the scene is obtained using (sequential) line scanning. Each line comprises several time gated exposures, enabling the extraction of depth and intensity information. As a result, a relatively small sensor area can be used while still achieving a large collecting aperture. The length of the sensor determines the FOV in one direction. The other direction is scanned with a traditional scanning approach, e.g., mechanical translation, rotation, or other approach.

According to the exemplary embodiments, a gated camera or detector or sensor is an active illumination camera with a global shutter. The system emits pulses of light into the environment. By opening the camera shutter with a precise time delay compared to a pulse, the camera captures an image of objects at a certain distance range. The width of this range bin is defined by the camera exposure time and the length of the pulse. By repeating this process and varying the delay between the camera shutter and the light pulse, several range bins can be captured. These range bins can finally be aggregated to a full image, with range information.

To improve the range accuracy and precision of this image, it is possible control the shutter in a way that gradually increases the sensitivity of the camera. By doing this and overlapping the exposure times between subsequent acquisitions, an object will typically appear in two acquisitions. Based on the relative intensity of the object between the two acquisitions, a more accurate range can be calculated. The illuminator and the camera are aligned so that they observe the same field of view (FOV), but do not need to be co-located, which add flexibility in integration.

Furthermore, according to the current disclosure, the compatibility with a large aperture lens also makes the current technology suitable for headlight integration, that is, integration of the sensor system with the headlight illumination system of the host vehicle. A dichroic mirror is used to separate the sensor light, which can be, for example, near infrared (NIR) or short-wave infrared (SWIR) light, from the visible, e.g., white, illumination light.

Described herein are exemplary implementations of systems and methods that use separate optical elements ("optics") for transmitting and receiving sensor signals. A type of sensor that may be used includes, for example, a LiDAR system to detect one or more objects exterior to the vehicle. LiDAR is a technique for determining ranges, e.g., variable distance, by targeting an object with a laser and measuring the time for the reflected light to return to the receiver.

In the exemplary systems described herein, the LiDAR system is integrated into headlight optics. More specifically, an infrared emitter outputs infrared light, such as an infrared laser beam, through the optics in the headlight, toward a target external to the vehicle, such as an object in the vehicle's path. The incident infrared light is reflected from the object back to the optics in the vehicle headlight. The optics in the vehicle headlight direct the reflected infrared light to a detector. The detector receives the reflected infrared light and is responsive to the reflected infrared light to determine the presence, location, size, and/or other features of the object.

Another potential advantage of the exemplary systems described herein is that existing headlight cleaning mechanisms can be used to clean the larger headlight optics used in the LIDAR system. Because there is no large, separate sensor optics to receive the reflected infrared light, there is likewise no need for separate cleaning mechanisms or additional cleaning solution for such sensor optics. This allows for more robust remediation and prevention of LiDAR sensor blockage by environmental effects such as dirt, mud, snow, rain, ice, etc.

FIG. 1 is a diagram illustrating part of a front end of an automobile 12, which includes an exemplary system 10, which integrates an optical sensing subsystem 14, such as, for example, LiDAR transmission and receiving elements and/or optics, and a lighting system 28 into a headlight system 25, in a headlight enclosure 26, according to some exemplary embodiments. Referring to FIG. 1, system 10 can be part of a vehicle such as an automobile 12 and, in particular, the front-end 13 of the automobile 12.

Components of system 10 can include an infrared emitter 14 to output infrared light towards a target. The infrared light may be a laser beam having wavelengths in the range of about 700 to 10,000 nanometers (nm). In some implementations, the infrared light is near infrared light (NIR), although the system is not limited as such. NIR light is generally considered to be in the range of 700 nm to 1,000 nm. In a particular example, the infrared light has a wavelength of about 940 nm. In some implementations, the infrared light is shortwave infrared light (SWIR). SWIR light is generally considered to be in a range of wavelengths from 1,000 to 2,500 nm.

Figure 2:
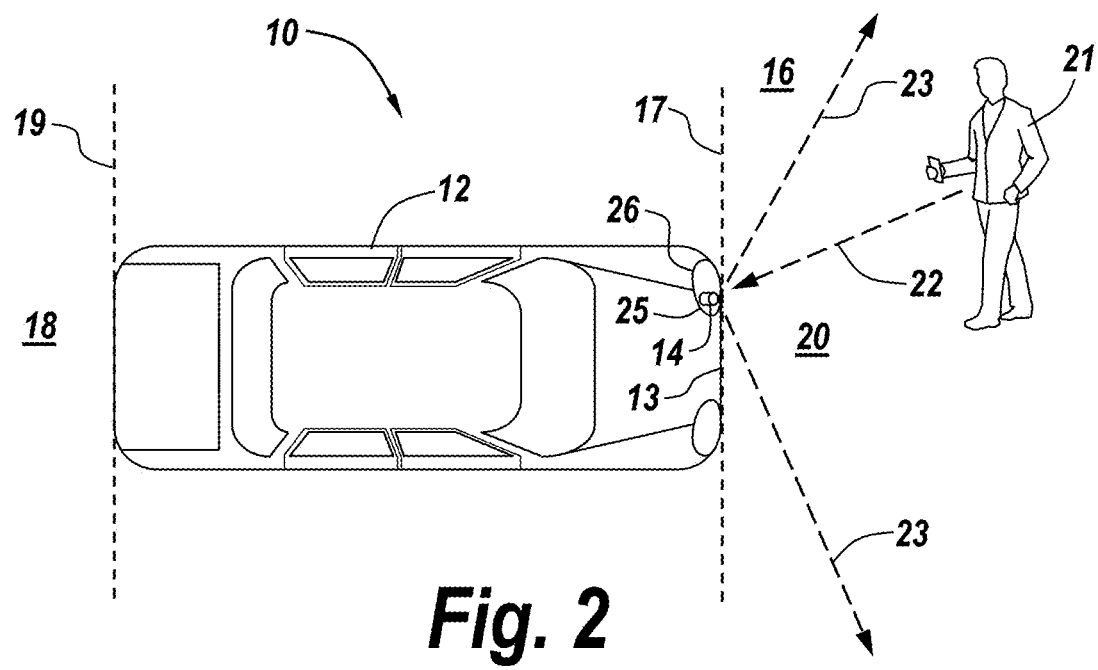
FIG. 2 is a top view of an automobile, such as the automobile of FIG. 1, according to some exemplary embodiments.

FIG. 2 is a top view of an automobile 12, such as the automobile of FIG. 1, according to some exemplary embodiments. Referring to FIGS. 1 and 2, infrared emitter 14 may include an edge emitting laser bar or an array of vertical-cavity surface-emitting lasers (VCSELs) (for example, 1×8) that are individually addressable and may be fired at the same time to scan a field of view (FOV) t in the front of automobile 12. As shown in FIG. 2, "the front" of automobile 12 is not limited to directly in front, but rather includes any area 16 that is in front of a line 17 parallel to the front end 13 of automobile 12. Likewise, "the back" of automobile 12 is not limited to directly in back, but rather includes any area 18 that is behind a line 19 parallel to a back end of automobile 12.

As shown in FIG. 2, infrared light 23 from infrared emitter 14 may be scanned in a region 20, in front of automobile 12. The scanned infrared light may be pulsed, frequency-modulated continuous wave (FMCW), amplitude modulated, or pseudo-random pulse coded. In some implementations, an emitter may be used that emits laser light other than infrared light for LiDAR scanning.

The infrared light incident on an object 21 (in this example, a person) is reflected by the object 21. The resulting reflected infrared light 22 propagates back to automobile 12. At least some of that reflected infrared light is incident on headlight 25. The optics, e.g., one or more optical elements, such as lenses and/or mirrors, in headlight 25 are configured to affect the direction and/or shape of the reflected infrared light such that the reflected infrared light is incident on an object detection subsystem. The detection subsystem, which is described below in detail, is part of the LiDAR optical object sensing subsystem and is configured to detect the reflected infrared light and to generate an output, such as a signal, based on the reflected infrared light. The signal may be read by, or output to, an onboard control system 32 (FIG. 7), such as an onboard computing system 32, that interprets the signal along with other reflected infrared signals to determine the presence, location, size, shape, motion, or other features of object 21 that reflected the infrared light.

Figure 3:
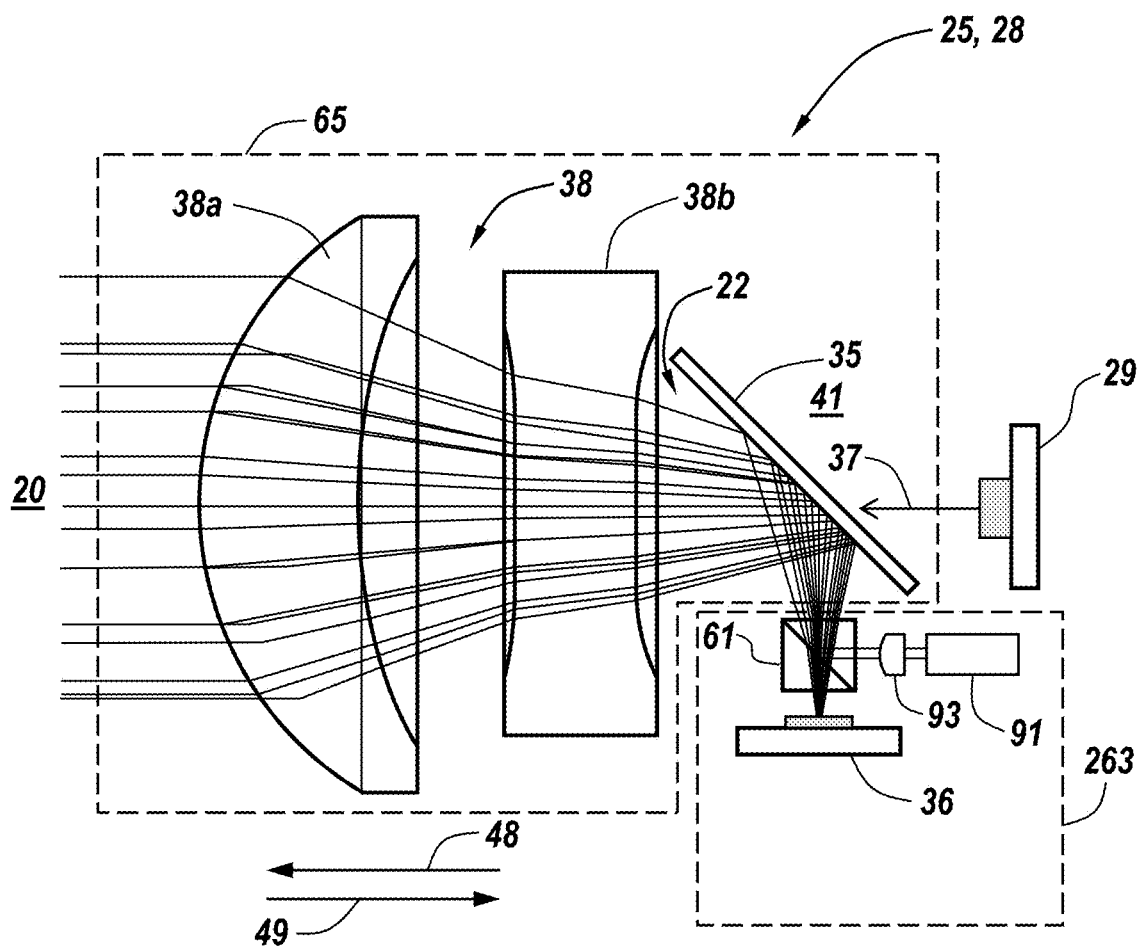
FIG. 3 is a schematic diagram illustrating a lighting and sensing system integrated in a vehicle headlight in an automobile, according to some exemplary embodiments.

FIG. 3 is a schematic diagram illustrating a lighting system 28 integrated in a vehicle headlight 25 in an automobile 12, according to some exemplary embodiments. The components of system 28 can be held in, and mounted to, a headlight enclosure 26 (FIGS. 1 and 2) that contains the headlight 25 and its various parts, as shown in FIG. 3. System 28 includes a light emitter 29 for emitting visible light and an object sensing or detection subsystem 63 comprising a one-dimensional source, also referred to herein as a "line emitter" or "line source," 91 of infrared light and a one-dimensional linear infrared light detector, also referred to herein as a "line sensor" or "line detector" 36. System 28 also includes an optical subsystem 65 for receiving the visible light and directing the visible light into the external region 20 outside the headlight 25 to illuminate the external region 20. Optical subsystem 65 also receives the infrared light from source 91 of infrared light and directs the infrared light onto object 21 in the external region 20. The optical subsystem 65 includes a partially reflective element, e.g., dichroic mirror 35, optically between light emitter 29 and external region 20 and optically between object sensing subsystem 63 and external region 20.

In some exemplary embodiments, light emitter 29, such as a light emitting diode (LED) array, is comprised of a matrix of collocated individual LEDs that are configured to emit white (visible) light. Use of an LED array may be advantageous because it eliminates or reduces the need for light guides in adaptive headlight systems 25. The light emitted from the LED array 29 may be visible light having wavelengths in a range of about 400 nanometers (nm) to about 700 nm. Light having any wavelength in this range may be emitted. The light from the LED array is the light that is output from the headlight 25 to illuminate a field in front of the automobile 12. The optical elements, e.g., lenses and/or mirrors, in the headlight are configured to affect the direction and/or shape of the visible light output to the environment.

Headlight system 25 can be controllable by the operator and/or a control system 32, which is described below with respect to FIG. 8, to operate in different modes such as low-beam operation and high-beam operations. During low-beam operation, the visible light flux from the headlight is typically on the order of 700 lumens. During high-beam operation, the visible light flux from the headlight is typically on the order of 1200 lumens. Regulations may specify headlight intensity in terms of candela (cd), where the range may be from 1200 cd for daytime running lights to 75,000 cd for high-beam operation. In any case, different vehicles may produce different light intensities for different modes of operation. In some implementations, during normal headlight operation, the direction of the output light is controllable; that is, the output light can be output in specified directions. For example, the laser array 29 and/or optics may be controlled to move in order direct the light output at specific angles based on signals received from control system 32. In some implementations, during normal headlight operation, the direction of the output light is not controllable.

As noted above, optical subsystem 65 includes dichroic mirror (or simply "mirror") 35, which separates the illumination path (visible light) from the sensor path (NIR/SWIR light). Mirror 35 is dichroic in the sense that it allows light of certain wavelengths to pass through the mirror unimpeded and reflects light of other wavelengths. In this example, mirror 35 is coated with a thin film that allows visible light to pass unimpeded while reflecting infrared (NIR/SWIR) light. A mirror of this type is known as a "hot mirror".

In the exemplary configuration of FIG. 3, mirror 35 is angled at about 45° relative to detector 36 and LED array 29. In other implementations the angle may be different; for example, the mirror may be angled at 25°, 35°, 65°, 75° and so forth, depending on the locations and angular position of detector 36 and LED array 29. Light 41 from LED array 29 passes in the direction of arrow 37 and proceeds through mirror 35 to optical elements 38, which are described below in detail, and, thereafter, out of the headlight 25. In contrast, as shown in FIG. 3, reflected infrared light 22, which entered headlight 25 from the external environment 20 and passed through optical elements 38, reflects off mirror 35, in this example at a 45° angle, and passes into object detection or sensing subsystem 63, through beam splitter 61, which in some exemplary embodiments can be a polarizing beam splitter, onto a surface of detector 36. Beam splitter 61 separates the transmit (Tx) and receive (Rx) optical paths. According to the current disclosure, detector 36 can be an infrared line sensor, which allows for the large field of view and reasonable cost achieved by the current technology. The reflected infrared light used in the LIDAR system may enter headlight 25 when LED array 29 is activated (for example, while the headlight is in low-beam or high-beam mode) or when LED array 29 is not activated (for example, while the headlight is off). Mirror 35 reflects the reflected infrared light in the same way regardless of the illumination of LED array 29. Accordingly, LIDAR object sensing subsystem 63 described herein works the same way regardless of the illumination of LED array 29.

Object detection or sensing subsystem 63 includes components of a LiDAR detection system. These components include infrared (NIR/SWIR) line illumination source 91 and optical elements 93, which can include at least a fast axis collimating lens, which is used to maximize the optical output power. The infrared light from source 91 is reflected by beam splitter 61 toward mirror 35, which directs the infrared light to the object 21 in the region 21 external to headlight 25.

In some implementations, detector 36 is or includes, for example, a one-dimensional array of PIN diodes or avalanche photodiodes (APDs). In another exemplary embodiment, detector 36 could also be or include an array of single-photon avalanche diodes (SPADs). Diode cells of detector 36 are responsive to infrared wavelengths of light, such as 940 nm or whatever wavelength is output by the infrared emitter. The cells are addressable in sequence by reflected infrared light resulting from infrared light scanned across a FOV in front of the automobile 12. In some implementations, the cells of the detector 36 react to incident infrared light 22, for example, by illuminating and/or generating signals based on the infrared light. In implementations that use laser light other than infrared light, detector 36 may be responsive to laser light other than infrared light.

Signals obtained via the LiDAR object detection or sensing system 63 may be used by the control system 32 (FIG. 8) to control and/or to inform various automobile operations including, but not limited to, automatic emergency braking for the automobile 12, forward sensing for the automobile 12, or automated/self-driving for the automobile 12. For example, if an object is detected in the automobile's path of travel, the automobile's brakes may be activated, or the steering of the automobile 12 may be controlled to avoid the object, as described below.

In this exemplary embodiment, optical elements 38 can include two lenses 38a, 38b; however, more than two or fewer than two lenses may be used. For example, one lens may be used or three, four, five or more lenses may be used. In this example, the two lenses are aspherical and include a convex lens 38b and a concave-convex lens 38a. As shown in FIG. 3, in this optics configuration, white (visible) light 41 from LED array 29 passes through mirror 35 and, thereafter, through lenses 38a, 38b in the manner shown to illuminate the environment 20 in front of the automobile 12. In contrast, referring to FIGS. 2 and 3, reflected infrared light 22 enters headlight 25 and optical elements 38 as shown. Lens 38a directs reflected infrared light 22 onto lens 38b, and lens 38b directs reflected infrared light 22 onto mirror 35. In an example, the lens system in its entirety focuses such that the incoming infrared light is focused when it reaches detector 36. Mirror 35 reflects reflected infrared light 22 onto detector 36, which reacts to the reflected infrared light as described above.

Stated otherwise, in a first direction 48 (FIG. 3) of the optical path containing lenses 38a, 38b, lenses 38a, 38b direct visible light 41 away from the LED array 29 and at least partially disperse the visible light into the environment 20 external to the automobile 12. In a second direction 49 of that same optical path, lenses 38a, 38b direct the reflected infrared light 22 onto mirror 35, which reflects that light onto detector 36.

According to the present disclosure, line-scan gated imaging is employed in the integrated headlight and sensing system. With a line sensor/detector 36 and a line illuminator or source 91, one-dimensional (1D) scanning is used to obtain three-dimensional (3D) data. According to the current disclosure, several approaches can be used to realize the scanning. For example, scanning may be realized externally, that is, with a scanning element before the front lens, by using, for example, Risley prisms, Galvo mirrors, polygonal mirror, LCD beam steering, etc.

However, according to the current disclosure, with the LiDAR object detection or sensing subsystem 63 integrated in the headlight 25, it is desirable to have an internal scanning mechanism. According to exemplary embodiments, this internal scanning can be implemented in one of at least two possible ways. In a first approach, hot mirror 35 is fixed in a stationary position, and LiDAR object detection or sensing subsystem 63 is translated along a flat image plane. In a second approach, LiDAR object detection or sensing subsystem 63 is fixed in a stationary position, and hot mirror 35 is a rotatable mirror.

Figure 4A:
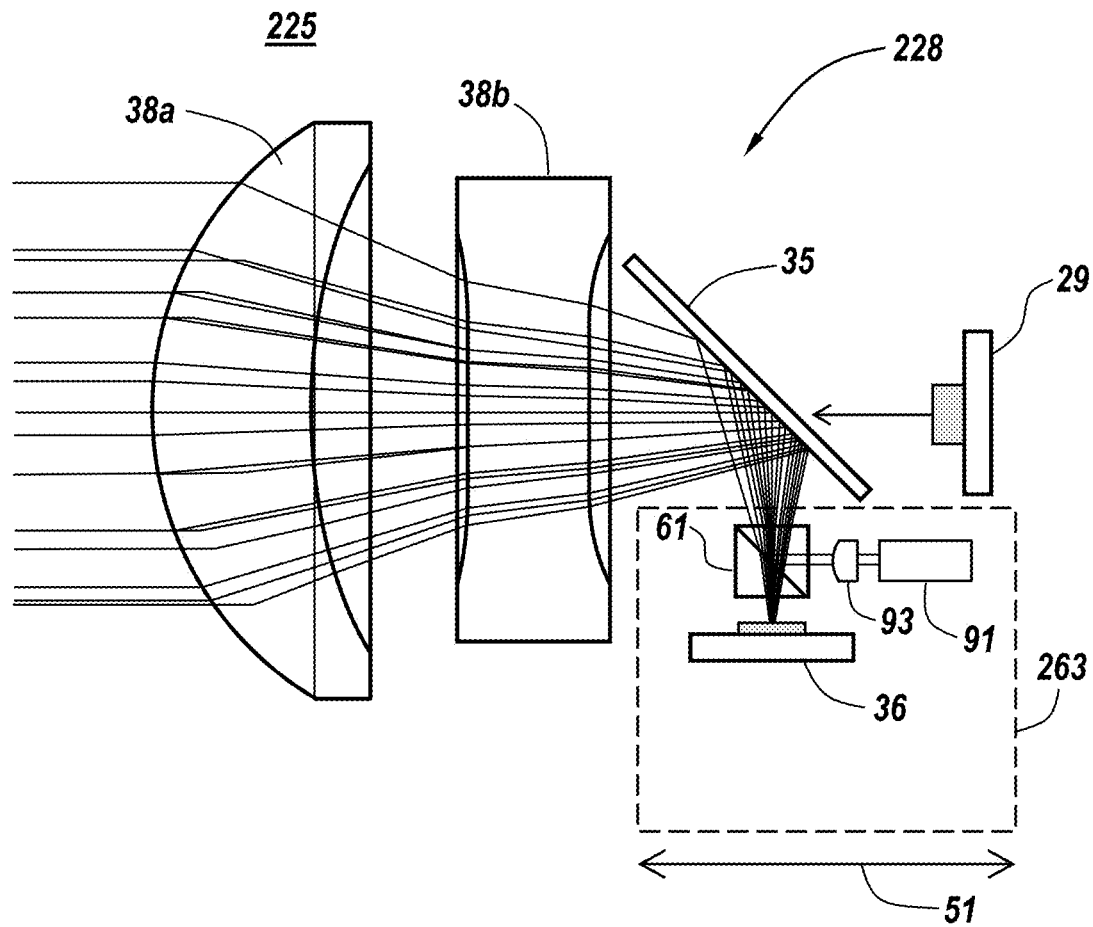
FIG. 4A is a schematic diagram illustrating another lighting and sensing system integrated in a vehicle headlight in an automobile, which includes a translatable LiDAR object detection and sensing subsystem to achieve line-scan-gated imaging, according to some exemplary embodiments.

FIG. 4A is a schematic diagram illustrating a lighting system 228 integrated in a vehicle headlight 225 in an automobile 12, which includes a translatable LiDAR object detection and sensing subsystem 263 to achieve line-scan-gated imaging, according to some exemplary embodiments.

Figure 4B:
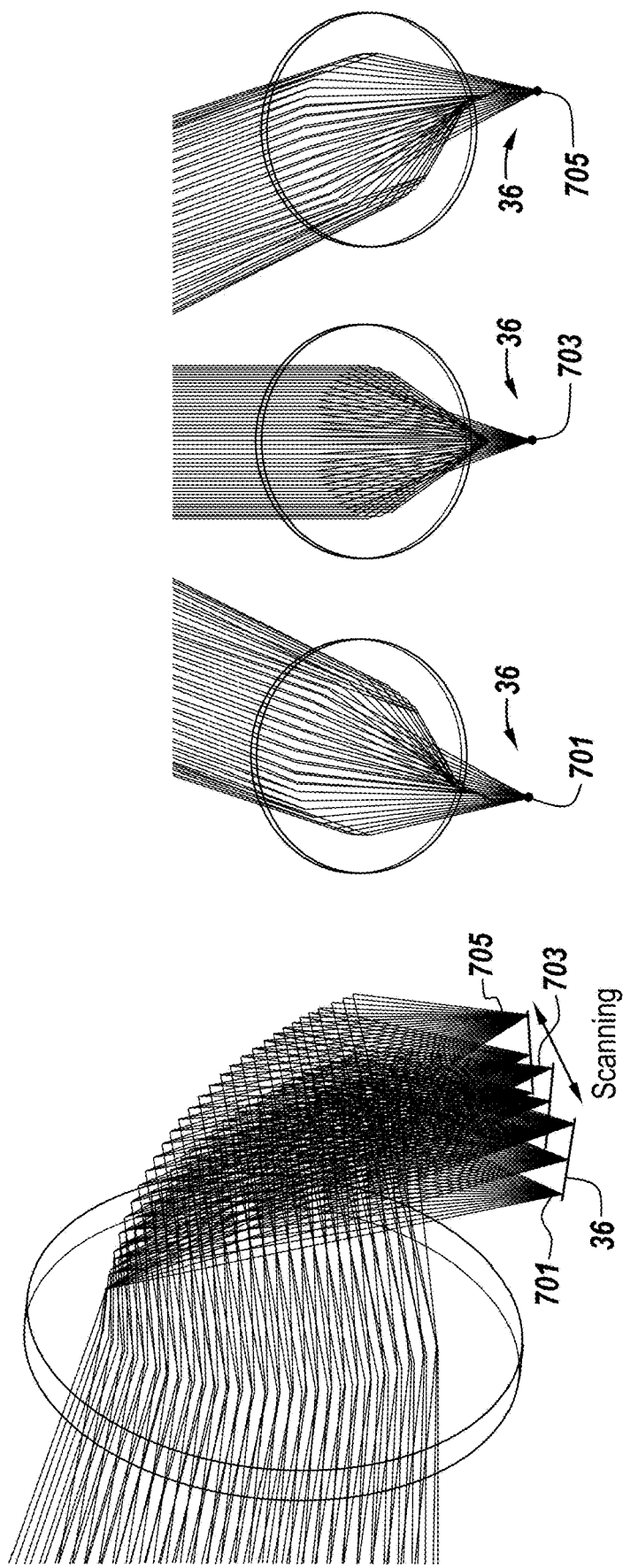
FIG. 4B is a schematic diagram illustrating the scanning across the detector, according to some exemplary embodiments.

Referring to FIG. 4A, LiDAR object detection or sensing subsystem 263 is controllable to translate back and forth along the direction indicate by arrow 51. Alternatively, or additionally, the translation direction can be in a direction perpendicular to arrow 51, that is, in and out of the plane of the drawing of FIG. 4A. FIG. 4B is a schematic diagram illustrating the scanning across the detector 36, according to some exemplary embodiments. Specifically, FIG. 4B illustrates the detection radiation in three different positions 701, 703, 705 during scanning, i.e., translation of the object detection and sensing subsystem 263. This translation of subsystem 263 enables the line-scan-gated imaging of the present disclosure.

Figure 5A:
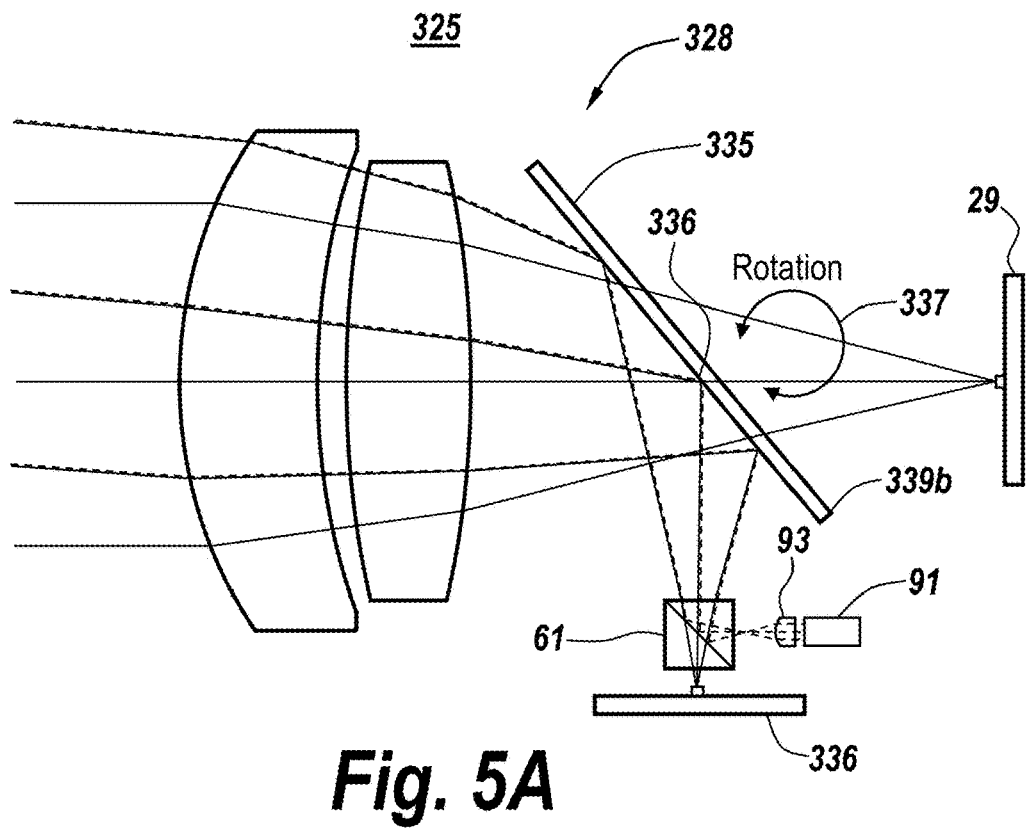
FIGS. 5A through 5D are schematic diagrams illustrating a lighting system integrated in a vehicle headlight in an automobile, which includes a rotatable hot mirror to achieve line-scan-gated imaging, according to some exemplary embodiments.
Figure 5B:
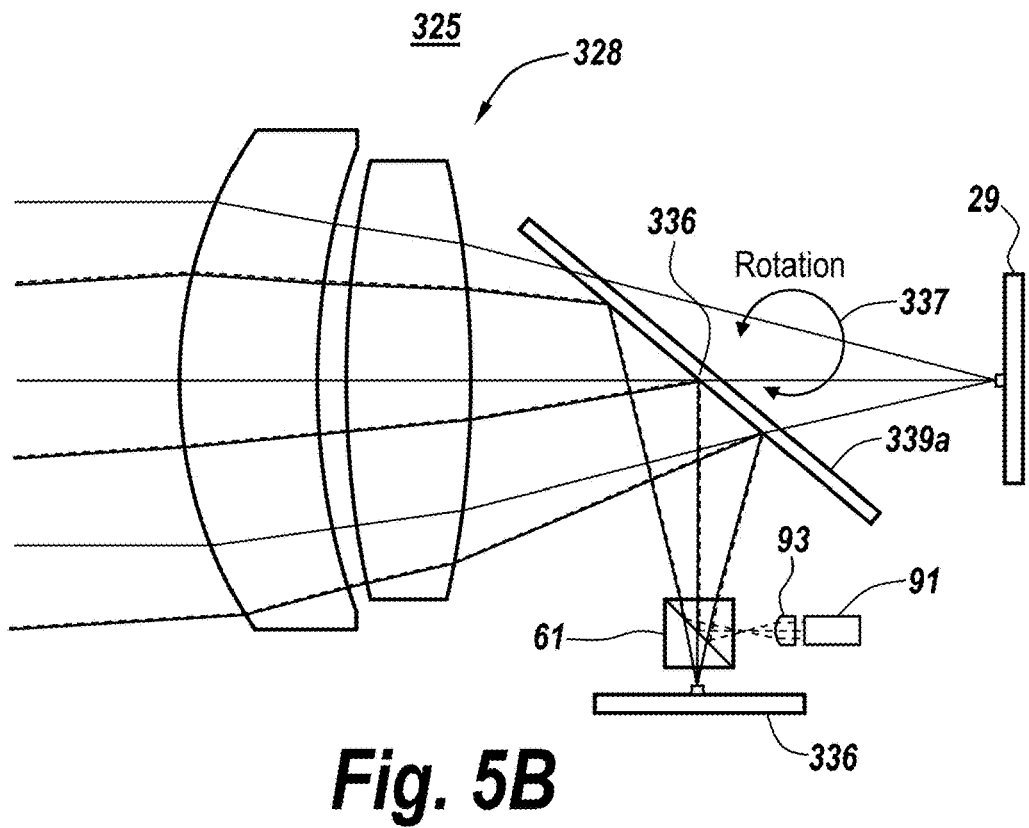
Figure 5C:
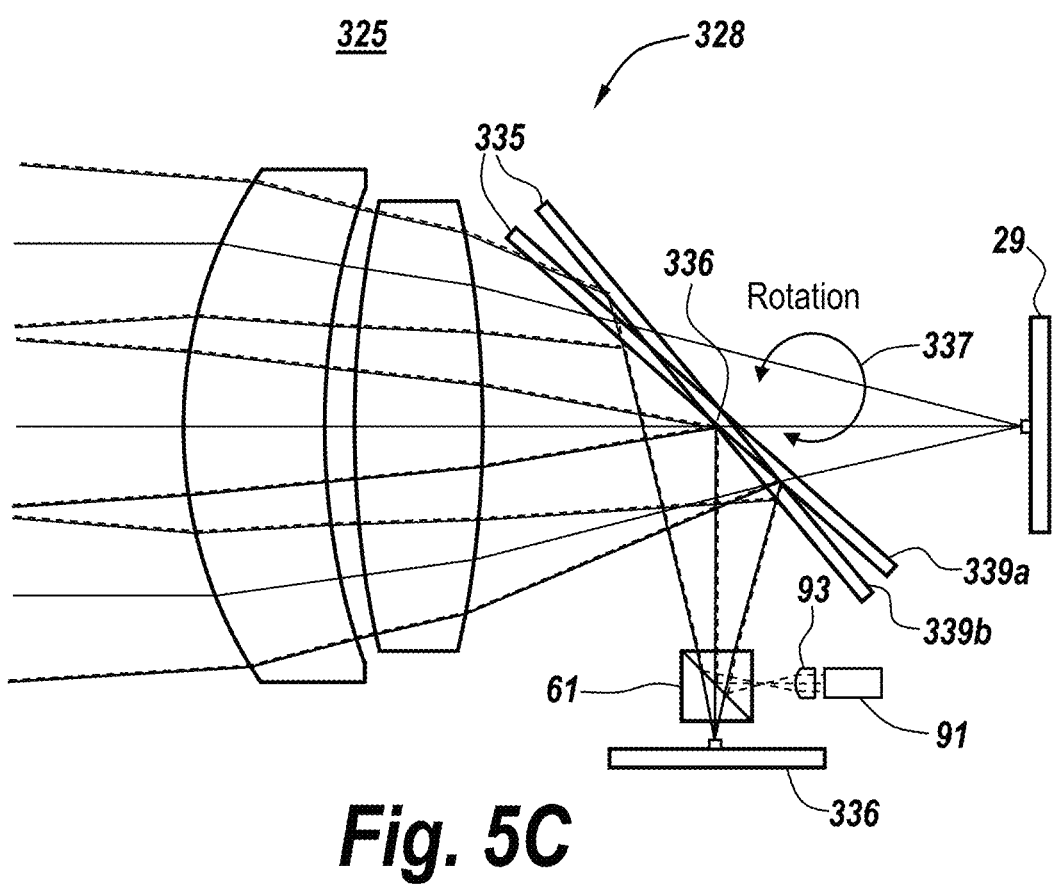
Figure 5D:
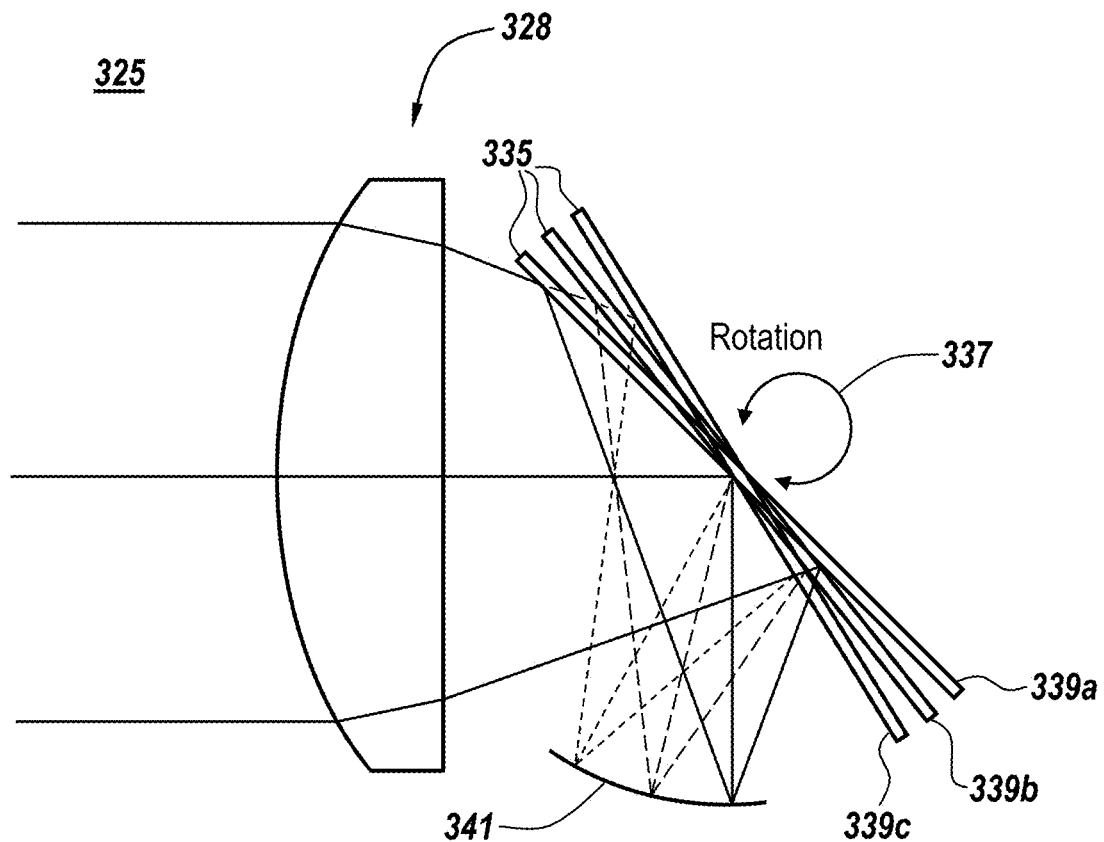
Figure 5E:
FIG. 5E is a schematic side view of a curved detector, rotated 90 degrees with respect to the views of FIGS. 5A through 5D, according to some exemplary embodiments.

FIGS. 5A through 5D are schematic diagrams illustrating a lighting system 328 integrated in a vehicle headlight 325 in an automobile 12, which includes a rotatable hot mirror 335 to achieve line-scan-gated imaging, according to some exemplary embodiments. FIG. 5E is a schematic side view of a curved detector 363, rotated 90 degrees with respect to the views of FIGS. 5A through 5D, according to some exemplary embodiments. Rotatable hot mirror 335 is controlled to rotate about an axis of rotation 336, as indicated by arrow 337. FIG. 5A illustrates hot mirror 335 in a first rotational position 339b; FIG. 5B illustrates hot mirror 335 in a second rotational position 339a; FIG. 5C illustrates the hot mirror 335 in both rotational positions 339a and 339b to illustrate the effects of the resulting scanning across detector 363; and FIG. 5D illustrates through curved line 341 the effect of the need for a curved image surface due to the hot mirror scanning, with hot mirror 335 in three rotational positions 339a, 339b, 339c. As illustrated in FIG. 5D, to have a line in focus on the sensor 363 plane, the optic elements, i.e., lenses, of system 328 need to form a cylindrical image plane. To keep the light focused, the lens system is configured so that the image curvature matches the optical distance from the axis of rotation of mirror 335 to the LiDAR object detection and sensing subsystem. That is, to avoid defocus out of the plane of the drawing, line sensor 363 is curved if the image curvature is rotationally symmetric, as is the case for rotationally symmetric lens systems. FIG. 5E illustrates the curvature in the detector 363. Curved line sensor 363 can be of the type manufactured and sold by Silina of Paris, France.

Figure 6:
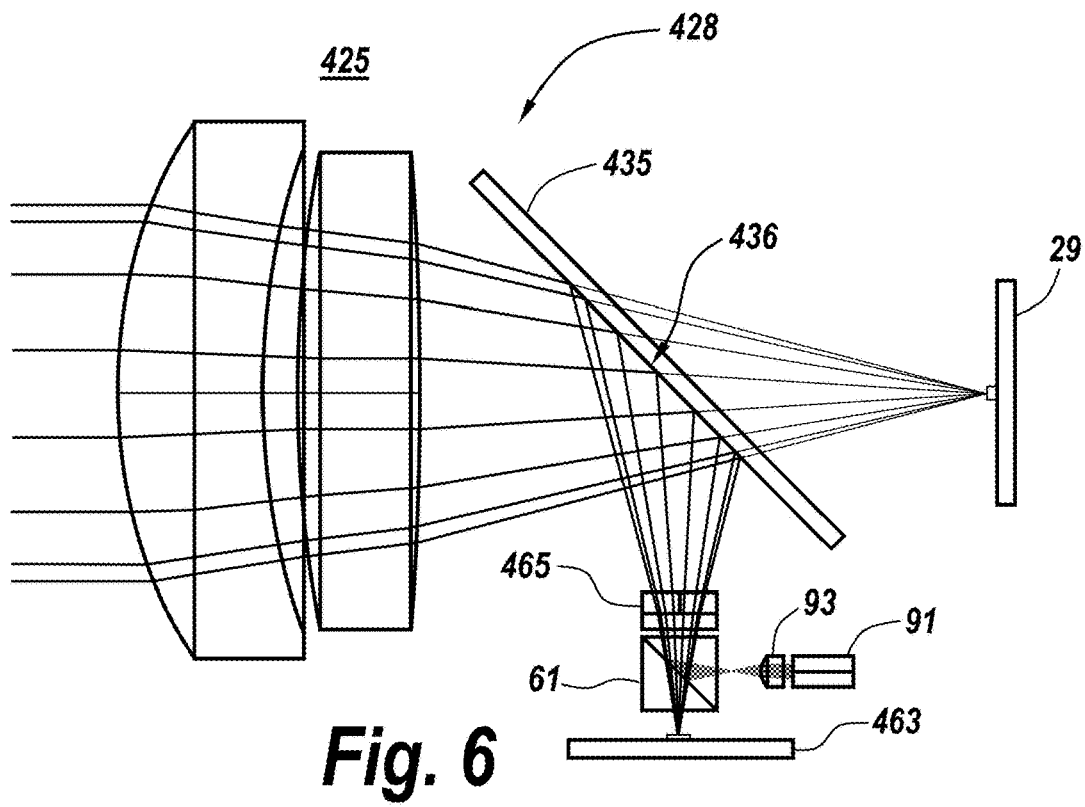
FIG. 6 is a schematic diagram illustrating another lighting system integrated in a vehicle headlight in an automobile, which includes a rotatable or oscillating hot mirror to achieve line-scan-gated imaging, according to some exemplary embodiments.
Figure 7:
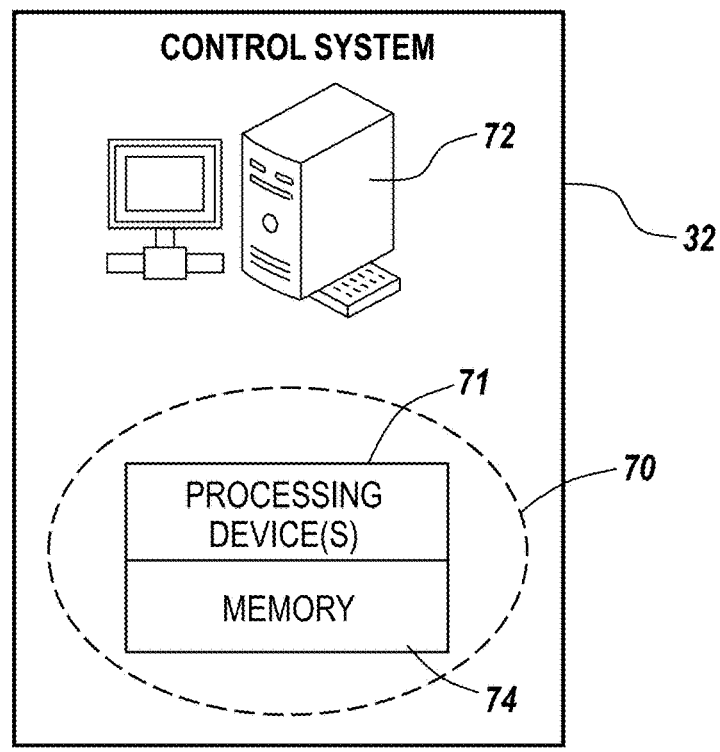
FIG. 7 includes a schematic block diagram of a control system which can be used in connection with any of the lighting systems described herein in detail, according to some exemplary embodiments.

In some exemplary embodiments, the image curvature can be compensated for as illustrated in FIG. 7. FIG. 6 is a schematic diagram illustrating a lighting system 428 integrated in a vehicle headlight 425 in an automobile 12, which includes a rotatable hot mirror 435 to achieve line-scan-gated imaging, according to some exemplary embodiments. Rotatable hot mirror 435 is controlled to rotate about an axis of rotation 436. In contrast to the embodiment of FIGS. 5A though 5D, in system 428 of FIG. 7, line sensor 463 is a flat line sensor. To avoid defocus introduced by rotating hot mirror 435, a cylindrical lens system 465, i.e., field flattener, is placed between hot mirror 435 and flat line sensor 463.

It should be noted that existing LED matrix headlights typically use a fast, single-element condenser lens (low f-number), with a curved image surface. Since the LEDs are typically mounted on a planar printed circuit board (PCB), light guides are needed to place the emission points in focus, which is needed for high-resolution projection. In contrast with these conventional approaches, the present technology takes advantage of the flat image plane needed for the detection/sensing subsystem and places the LED PCB directly in focus, without the need to use light guides. In some embodiments, telecentric optics are used to maximize the efficiency of the illumination system.

Generally, in gated imaging, multiple exposures, typically two to eight exposures, are used to create crude range bins, i.e., if a certain object appears brighter in one of the images, it is concluded that the distance is within the distance interval defined by the start and stop of the exposure (time). Since the exposures will have finite rise and fall times (due to the electrical bandwidth), a certain object can potentially be seen in multiple (typically two) exposures. As a result, more detailed distance information can be extracted. The associated calculations give a deterministic distance output.

An alternative approach to make distance estimates, according to the present technology, is to use the image slices as input to a convolutional neural network (CNN) that has been trained with ground truth from another 3D data collection system, e.g., a LiDAR. The approach is to use the same approach (deterministic and/or artificial intelligence), with a difference being that the image is scanned line by line, instead of acquiring the full field in every exposure.

FIG. 7 includes a schematic block diagram of a control system 32 which can be used in connection with any of the lighting systems 28, 228, 328, 428, and 528 described herein in detail, according to some exemplary embodiments. The exemplary automobile lighting systems described herein may be controlled by a control system, such as control system 32 of FIG. 8, to control all or part of the operation of the system components. Control system 32 may be part of an onboard control system on the automobile 12. As shown in FIG. 8, in some implementations, an onboard portion 70 of control system 32 includes one or more processing devices 71 of the type described herein that are programmable to control operations of at least some of the components of the system and to receive data from sensing/detection subsystems to detect objects according to the exemplary embodiments. The onboard portion 70 of control system 30 may also include memory 74 for storing data and programs executable by the one or more processing devices 71 to implement all or part of the functionality described herein. The control system 32 may also include an external computing system 72 that communicates to the onboard control portion 70. For example, the external computing system 72 may communicate with the onboard control portion 70 using a cellular network, Bluetooth communication protocol, or other appropriate wireless functionality.

Figure 8:
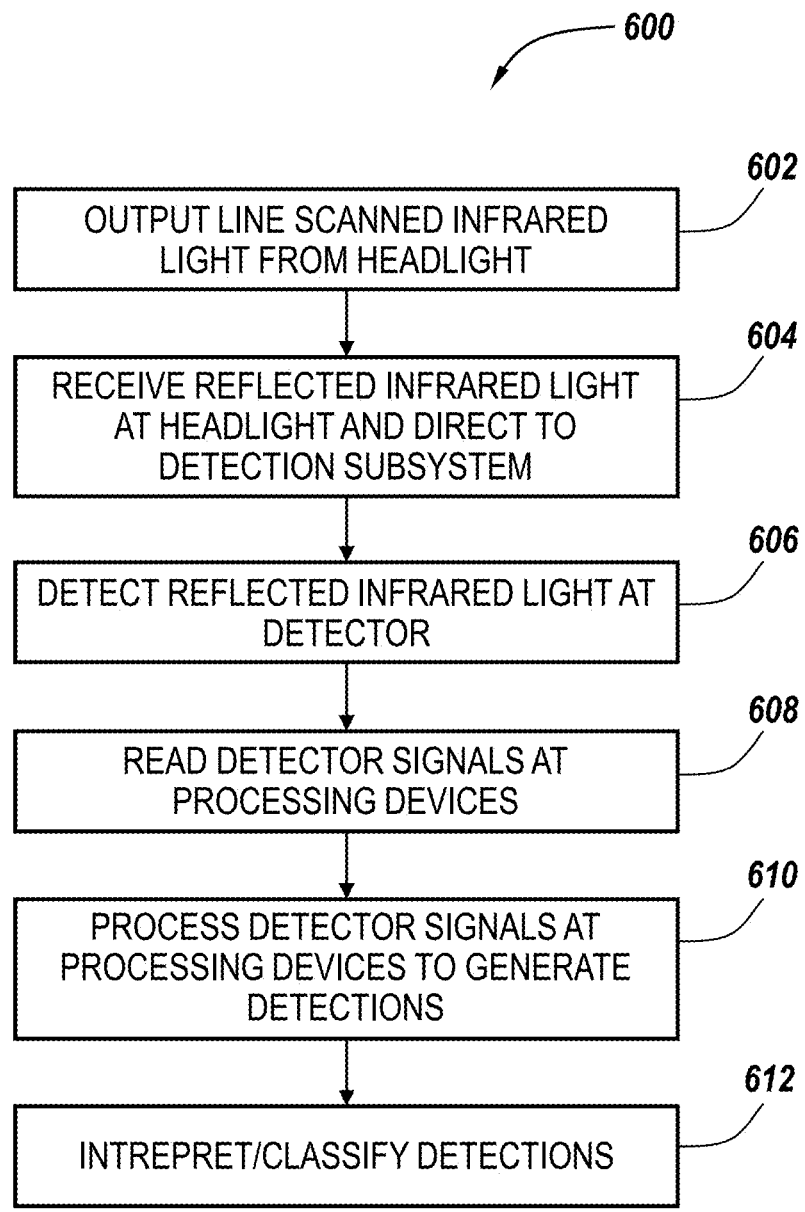
FIG. 8 is a logical flow diagram illustrating the logical flow of a method of detection in a vehicle headlight system, such as the headlight systems described herein, according to some exemplary embodiments.

FIG. 8 is a logical flow diagram illustrating the logical flow of a method 600 of detection in a vehicle headlight system, such as the headlight systems described herein, according to some exemplary embodiments. Referring to FIG. 8, in step 602, sensing or detection radiation, such as infrared light, is line-scan emitted from the headlight by a sensing/detection subsystem, such as a LiDAR object sensing or detection subsystem described herein in detail, to scan a region external to the vehicle. In step 604, all or part of the sensing or detection radiation, e.g., infrared light, as reflected from an object external to the vehicle headlight system, is received at the headlight and is directed toward the sensing/detection subsystem. In step 606, a detector in the sensing/detection subsystem, such as line detectors 36, 463, 563 described herein, receives and detects, in a line-scan gated fashion, the reflected infrared light. In step 608, signals from the detector are received and read at processing devices 71 in control system 32. In step 610, the received and read detector signals are processed at processing devices 71 to generate object detections. In step 612, the detections can be interpreted and/or classified, and reported. For example, the control system may output a warning on a display screen on the interior of the cabin, output an audible warning, or take control of the vehicle whether or not an operator is otherwise controlling the vehicle. For example, the control system may control the automobile's brakes to stop or to slow-down before reaching the object or the control system may control the automobile's steering to avoid the object preemptively. Other controls not described herein also may be implemented.

Although the preceding descriptions focus on using LiDAR on a vehicle's front-end, LiDAR may be incorporated on the back end of a vehicle to scan the region behind the vehicle (FIG. 2) using the techniques described herein, where the taillight optics are used as receiving optics for reflected infrared (or other wavelength) signals. Furthermore, the systems and techniques are not limited to use with automobiles, but rather may be used with any type of vehicle, whether operator-drive or automated. Still further, a LiDAR system of the type described herein may be implemented using more than one headlight or taillight. For example, each vehicle headlight or taillight may include LiDAR functionality of the type described herein. In some cases, a single infrared emitter may be serviced by headlight LiDAR functionality in two front-end headlights of the type described herein or each headlight LiDAR functionality may operate with a separate, dedicated infrared emitter. The same is true for taillight LiDAR configurations. Still further, the systems and techniques are not limited to use with vehicle lights, but rather may integrate any type of light source into a LiDAR system for use as receiving optics as described herein.

All or part of the systems and processes described in this specification and their various modifications may be configured or controlled at least in part by one or more computing systems, such as control system 32, using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with configuring or controlling the systems and processes described herein can be performed by one or more programmable processors executing one or more computer programs to control or to perform all or some of the operations described herein. All or part of the systems and processes can be configured or controlled by special purpose logic circuitry, such as, an FPGA (field programmable gate array) and/or an ASIC (application-specific integrated circuit) or embedded microprocessor(s) localized to the instrument hardware.

Processors suitable for the execution of a computer program include, by way of example, both general and special purpose microprocessors, and any one or more processors of any kind of digital computer. Generally, a processor will receive instructions and data from a read-only storage area or a random-access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A system, comprising:
   a light emitter for emitting visible light;
   an object sensing subsystem comprising an infrared line emitter for emitting infrared detection radiation and an infrared line detector; and
   an optical subsystem for receiving the visible light and directing the visible light into an external region to illuminate the external region and for receiving the infrared detection radiation from the infrared line emitter and directing the infrared detection radiation onto an object in the external region, the optical subsystem comprising a partially reflective element optically between the infrared line emitter and the external region and optically between the object sensing subsystem and the external region, the partially reflective element being configured to pass one of the infrared detection radiation and the visible light and to reflect the other of the infrared detection radiation and the visible light, such that the object sensing subsystem senses the object in a line-scan-gated mode.

2. The system of claim 1, wherein the partially reflective element comprises a dichroic mirror.

3. The system of claim 1, wherein the partially reflective element is rotatable about a pivot axis such that the object sensing subsystem senses the object in the line-scan-gated mode.

4. The system of claim 1, wherein the object sensing subsystem is translatable with respect to the partially reflective element such that the object sensing subsystem senses the object in the line-scan-gated mode.

5. The system of claim 1, wherein the optical subsystem is adapted to provide relative motion between the partially reflective element and the object sensing subsystem such that the object sensing subsystem senses the object in the line-scan-gated mode.

6. The system of claim 5, wherein the relative motion between the partially reflective element and the object sensing subsystem is effected by rotation of the partially reflective element.

7. The system of claim 5, wherein the relative motion between the partially reflective element and the object sensing subsystem is effected by translating the object sensing subsystem.

8. The system of claim 1, wherein the system comprises a headlight of a vehicle.

9. The system of claim 1, wherein the object sensing subsystem comprises components of a light detection and ranging (LiDAR) system for a vehicle.

10. The system of claim 1, wherein the light emitter comprises an array of light-emitting diodes.

11. The system of claim 1, wherein the detection radiation is infrared light.

12. The system of claim 11, wherein the infrared light is near infrared (NIR) light.

13. The system of claim 11, wherein the infrared light is shortwave infrared (SWIR) light.

14. An object detection method for a vehicle headlight, comprising:
    emitting visible light from a light emitter;
    providing an object sensing subsystem with an infrared line emitter for emitting infrared detection radiation and a linear infrared line detector; and
    with an optical subsystem, receiving the visible light and directing the visible light into an external region to illuminate the external region, receiving the infrared detection radiation from the infrared line emitter and directing the infrared detection radiation onto an object in the external region, the optical subsystem comprising a partially reflective element optically between the light emitter and the external region and optically between the object sensing subsystem and the external region, the partially reflective element being configured to pass one of the infrared detection radiation and the visible light and to reflect the other of the infrared detection radiation and the visible light, such that the object sensing subsystem senses the object in a line-scan-gated mode.

15. The method of claim 14, wherein the partially reflective element comprises a dichroic mirror.

16. The method of claim 14, further comprising rotating the partially reflective element about a pivot axis such that the object sensing subsystem senses the object in the line-scan-gated mode.

17. The method of claim 14, further comprising translating the object sensing subsystem with respect to the partially reflective element such that the object sensing subsystem senses the object in the line-scan-gated mode.

18. The method of claim 14, further comprising providing relative motion between the partially reflective element and the object sensing subsystem such that the object sensing subsystem senses the object in the line-scan-gated mode.

19. The method of claim 18, further comprising rotating the partially reflective element to provide the relative motion between the partially reflective element and the object sensing subsystem.

20. The method of claim 18, further comprising translating the object sensing subsystem to provide the relative motion between the partially reflective element and the object sensing subsystem.

21. The method of claim 14, wherein the object sensing subsystem comprises components of a light detection and ranging (LiDAR) system for a vehicle.

22. The method of claim 14, wherein the light emitter comprises an array of light-emitting diodes.

23. The method of claim 14, wherein the detection radiation is infrared light.

24. The method of claim 23, wherein the infrared light is near infrared (NIR) light.

25. The method of claim 23, wherein the infrared light is shortwave infrared (SWIR) light.

* * * * *